March 21, 1961 D. T. MILNE 2,976,131
CONTINUOUS REACTION VESSEL
Filed Feb. 20, 1958 2 Sheets-Sheet 1

March 21, 1961  D. T. MILNE  2,976,131
CONTINUOUS REACTION VESSEL
Filed Feb. 20, 1958  2 Sheets-Sheet 2

United States Patent Office

2,976,131
Patented Mar. 21, 1961

2,976,131

CONTINUOUS REACTION VESSEL

David T. Milne, Fredericksburg, Va., assignor to American Viscose Corporation, Philadelphia, Pa., a corporation of Delaware Filed Feb. 20, 1958, Ser. No. 716,340

5 Claims. (Cl. 23—285)

This invention relates to apparatus for the continuous chemical reaction of solids and gases. While the apparatus is useful for such reactions generally, it is particularly applicable in the continuous etherification of alkali cellulose with ethylene oxide to form hydroxyethyl cellulose, for which there are numerous commercial uses.

Heretofore, hydroxyethyl cellulose has been produced by the batch process which requires the loading of a vessel with a batch of alkali cellulose and subjecting it to the action of ethylene oxide, after which the reaction product has to be dumped from the vessel before starting the treatment of the next batch. Naturally, such a method of production results in a loss of both time and materials and is apt to result in considerable non-uniformity of product between the various batches due to slight differences in quantities of materials in the different batches and/or variations in the timing of the reactions.

It is accordingly the primary object of the present invention to provide a reaction vessel into which alkali cellulose and ethylene oxide may be continuously admitted and from which the reaction product may be continuously discharged and to provide such vessel with means to assure that each particle of alkali cellulose receives the same effective contact with the ethylene oxide as every other particle.

It is a more general object of this invention to provide a continuous reaction vessel particularly suited to the etherification of alkali cellulose with ethylene oxide.

Other and further objects, features and advantages of the invention will become apparent as the description of a preferred embodiment thereof proceeds.

Referring now to the drawings.

Figure 2:
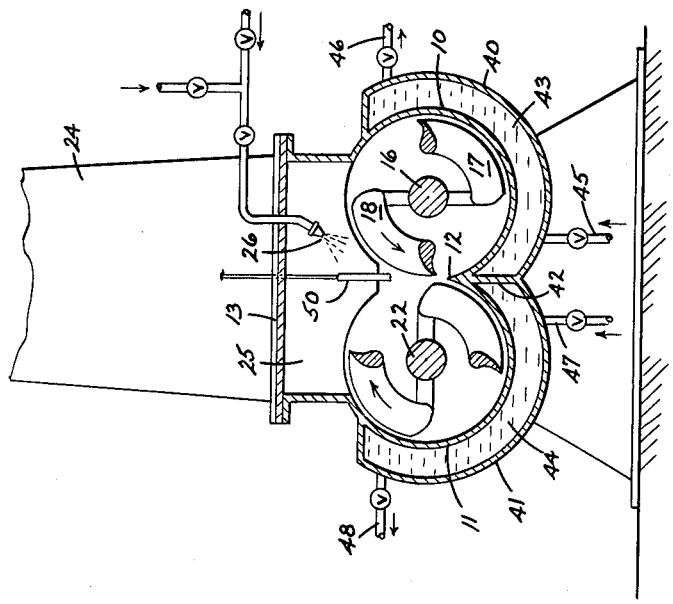
Figure 2 is a transverse sectional view taken on the line II—II of Figure 1.

The reaction vessel of the present invention comprises an elongated, horizontally arranged closed container having, as best shown in Figure 2, integrated side and bottom walls 10 and 11 which intersect at 12 in the lower part of the vessel to thus divide the bottom portion of the vessel into two longitudinally extending chambers. The vessel is closed by means of a top 13, an end wall 14 and an adjustable closing partition generally indicated at 15 located at the opposite end of the vessel from the wall 14 and which will presently be described.

Figure 3:
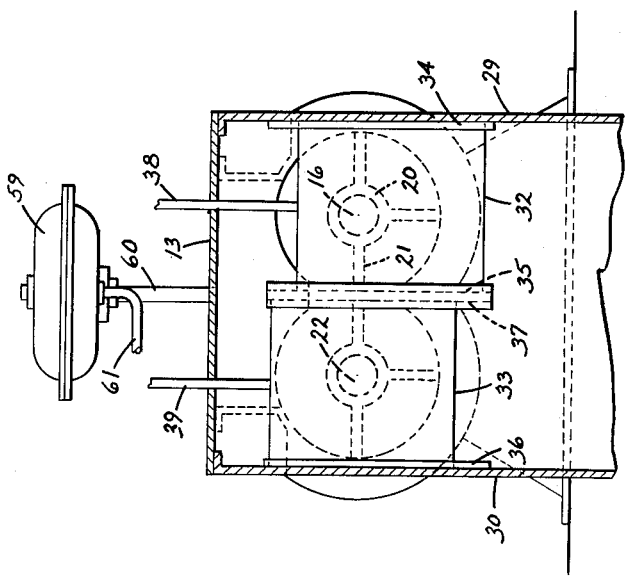
Figure 3 is a view taken along the line III—III of Figure 1.

Mounted within one of the longitudinal chambers of the vessel is an agitating reel comprising a central drive shaft 16 and a pair of blades 17 and 18. The shaft 16 is rotatably mounted at one end of the vessel in a bearing 19 provided in the end wall 14 and at its opposite end is rotatable in a bearing 20 supported from the side and bottom wall of the vessel as by means of braces 21, as best shown in Figure 3. A similar agitating reel having a central shaft 22 is mounted in a similar manner in the other longitudinal chamber of the vessel. The reel shafts 16 and 22 extend through the end wall 14 and are driven in opposite directions as, for example, by means of chain drives 23, only one of which is shown. The paths described by the blades of the agitating reels are substantially tangential to one another and conform closely with the respective side and bottom walls 10 and 11 so as to both agitate the contents of the vessel and break up any lumps that may be formed during the reaction, or which may be present in the material when it is introduced into the vessel.

Figure 1:
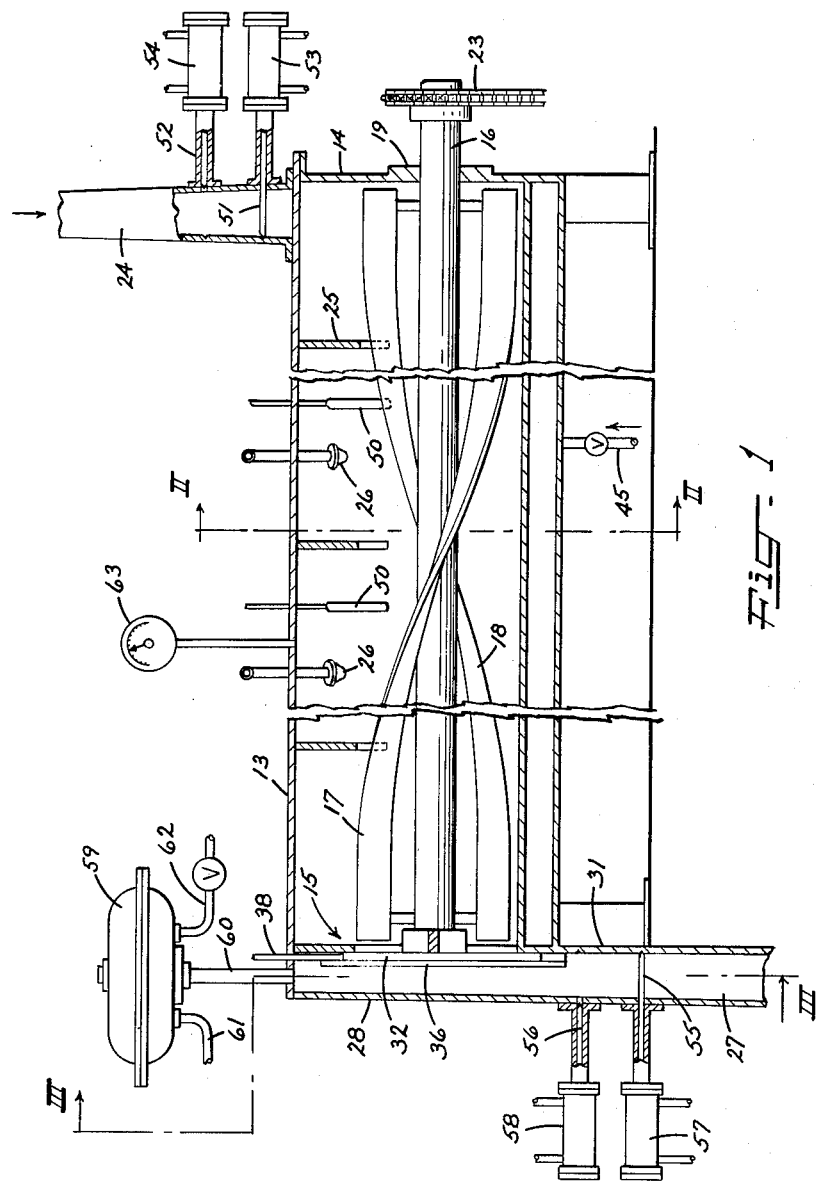
Figure 1 is a longitudinal sectional view of the apparatus.

A loading chute 24 provides an inlet to the vessel for alkali cellulose crumbs which are preferably supplied from a continuous steeping, pressing and shredding machine, but which may be from any convenient source so long as the crumbs are supplied at a constant continuous rate. As indicated in Figure 1, the chute 24 opens into the top of the vessel adjacent the end wall 14 and is flared outwardly toward the bottom to prevent crumbs from sticking to the sides thereof.

The upper portion of the vessel is effectively divided into segments by means of transverse partitions 25 which, as shown, have arcuate bottom edges closely conforming to the paths described by the blades of the agitating reels. An ethylene oxide spray is introduced at a controlled rate through spray nozzles 26 into the upper segments defined by the partitions 25. As will presently be explained, it is preferable not to introduce the ethylene oxide into that segment of the vessel located directly beneath the intake chute 24 nor into that segment located at the discharge end of the vessel.

A discharge chute 27 is located at the opposite end of the vessel from the intake chute 24. The discharge chute has a solid outer wall 28, side walls 29 and 30 and an inner wall 31 having an opening therein whereby the contents of the vessel may be discharged into said chute. A pair of slidably mounted gates 32 and 33 mounted on the inner wall 31 of the discharge chute control the rate at which the contents of the vessel will be permitted to enter the chute. The gate 32 operates in a track 34 secured to the side wall 29 of the discharge chute and a track 35 mounted centrally of the end of the vessel, while the gate 33 operates in a track 36 carried by the wall 30 of the chute and a centrally located track 37. The gates 32 and 33 are operated exteriorly of the vessel by any suitable means, operating rods 38 and 39 for the gates 32 and 33, respectively, extending upwardly through the top 13 of the vessel.

Since the reaction between ethylene oxide and alkali cellulose is exothermic, it is necessary to provide means for cooling the vessel and to this end the side and bottom walls 10 and 11 are provided with jackets 40 and 41, respectively, the space between the jackets and the walls of the chambers being divided by a partition 42 into two compartments 43 and 44 through which brine or other coolant is circulated. The compartment 43 is provided near the bottom with an inlet 45 and near the top with an outlet 46. The compartment 44 is provided with its own independent inlet 47 and outlet 48. Thus, cooling liquids are circulated independently through two compartments to provide controlled cooling for the two longitudinal sections of the vessel. The movement of the coolant through the compartments 43 and 44 may be controlled by conventional means from thermometers 50 located interiorly of the vessel.

To control the rate at which the alkali cellulose crumbs are introduced into the vessel and to prevent pressure changes within the vessel, the intake chute 24 is provided with a lock comprising sliding gates 51 and 52 operated respectively by pneumatic or hydraulic cylinders 53 and 54. The partitions 51 and 52 are moved alternately into and out of the chute 24 at the desired rate, one of the partitions always providing a closure for the chute.

The discharge chute 27 is provided with a lock comprising sliding gates 55 and 56 operated respectively by cylinders 57 and 58 in the same manner as the lock for the intake chute 24.

To maintain a constant pressure within the vessel a suitable commercial pressure regulating device 59 is connected through a pipe 60 to the upper portion of the discharge chute 27 through the top 13 of the vessel. In the event of an abnormal pressure within the vessel the pressure regulating device 59 may discharge outside of the building through a pipe 61. Should be pressure within the vessel become abnormally low, an inert gas such as nitrogen may be pumped into the pressure regulating device 59 through a connection 62. A suitable pressure gauge 63 keeps the operator apprised of pressure conditions within the vessel.

The agitating reels are not only rotated in opposite directions but are driven at different speeds, and by varying the speed ratio between the two reels the material can be moved from the entry end of the vessel to the discharge end over a wide range of speeds, as may be desired.

The vessel may be put into operation and shut down from time to time without loss of materials. When starting up the machine alkali cellulose crumbs are admitted through the feed chute 24 at the rate at which it is desired to operate the machine when it is in full operation. The operation of the reels at different speeds in order to move the material through the vessel is believed to be one of the novel features of this invention. As the crumbs move through the machine ethylene oxide is admitted through the spray nozzles 26 at rates proportional to the weight of crumbs in the different segments of the machine as defined by the partitions 25. That is to say, the spray nozzle in the compartment located nearest the entry end is put into operation first, and the other nozzles further along toward the discharge chute are started up one by one as the crumbs move through the vessel. Even after the vessel becomes filled with crumbs, it is sometimes desirable to admit the ethylene oxide into the different segments at different rates but the continuous agitation of the crumbs by the reels and the continuous movement of the crumbs lengthwise through the vessel assure that each particle of alkali cellulose is acted upon by the same amount of ethylene oxide as every other particle. After the machine is full, the discharge controlling gates 32 and 33 are lower to a point where the total output in any given period of time will be the same as the total input of the vessel. When the machine is to be shut down the discharge partitions 32 and 33 are lowered further at a gradual rate so that the rate of discharge will remain the same even though the supply of alkali cellulose has been discontinued. The ethylene oxide sprays 26 will then be turned off in the same order in which they were turned on.

The following is given as a practical example for the size and speed of operation of the machine:

The reels are 755 cm. long and describe circles 50 cm. in diameter. The etherification section of the machine is divided by the partitions 25 into 9 segments, each of which is 72 cm. by 72 cm. at the top and into each of which ethylene oxide is introduced. The segment which is under the feed chute 24 is 25 cm. long and there is a cooling section at the end of the machine next to the discharge chute which is 72 cm. long and into which ethylene oxide is not admitted, so as to give the crumbs an opportunity to cool before being discharged from the machine. The working capacity of the etherification section is 2540 liters. Alkali cellulose crumbs are delivered to the feed chute at the rate of 10.56 kg. per minute. Ethylene oxide is admitted at the rate of 0.35 kg. per minute, or 0.039 kg. of ethylene oxide to each of the 9 segments. The temperature of the crumbs is maintained at 45° C. by brine circulating in the chambers 43 and 44. The etherified crumbs are cooled to 30 to 35° C. before entering the discharge chute.

Having thus described a preferred form and mode of operation of the invention, what is claimed is:

1. A vessel for the continuous chemical reaction of alkali cellulose with ethylene oxide to produce hydroxyethyl cellulose comprising a horizontally arranged elongated container, two agitating reels mounted on parallel axes extending longitudinally through said container, means rotating said reels in opposite directions at speeds differing from one another, said reels having blades which describe substantially tangential paths, said container having bottom and outer side walls closely conforming with the paths of said blades and an upper compartment in open communication with both of said reels, partitions in said upper compartment, said partitions extending across said upper compartment transversely of the axes of said reels and having lower curved edges substantially conforming with the paths of said blades to divide said upper compartment into a plurality of segments longitudinally of said vessel, means for selectively introducing an ethylene oxide spray into said segments, means for continuously introducing alkali cellulose crumbs into one end of said container at a controlled rate, said reels, because of the differing speeds, moving said crumbs longitudinally through said container and agitating them so that each particle of alkali cellulose is uniformly contacted and reacted with the ethylene oxide, and adjustable means controlling the rate of discharge of the reacted product from said container.

2. A vessel for the continuous chemical reaction of alkali cellulose with ethylene oxide to produce hydroxyethyl cellulose comprising a horizontally arranged elongated container, two agitating reels mounted on parallel axes extending longitudinally through said container, means rotating said reels in opposite directions at speeds differing from one another, said reels having blades which describe substantially tangential paths, said container having bottom and outer side walls closely conforming with the paths of said blades and an upper compartment in open communication with both of said reels, partitions in said upper compartment, said partitions extending across said upper compartment transversely of the axes of said reels and having lower curved edges substantially conforming with the paths of said blades to divide said upper compartment into a plurality of segments longitudinally of said vessel, means for selectively introducing an ethylene oxide spray into said segments, means for continuously introducing alkali cellulose crumbs into one end of said container at a controlled rate, said reels, because of the different speeds, moving said crumbs longitudinally through said container and agitating them so that each particle of alkali cellulose is uniformly contacted and reacted with the ethylene oxide, adjustable means controlling the rate of discharge of the reacted product from said container, and means controlled by the temperature within said container for cooling said container.

3. A vessel for the continuous chemical reaction of alkali cellulose with ethylene oxide to produce hydroxyethyl cellulose comprising a horizontally arranged elongated container, two agitating reels mounted on parallel axes extending longitudinally through said container, means rotating said reels in opposite directions at speeds differing from one another, said reels having blades which describe substantially tangential paths, said container having bottom and outer side walls closely conforming with the paths of said blades and an upper compartment in open communication with both of said reels, partitions in said upper compartment, said partitions extending across said upper compartment transversely of the axes of said reels and having lower curved edges substantially conforming with the paths of said blades to divide said upper compartment into a plurality of segments longitudinally of said vessel, means for selectively introducing an ethylene oxide spray into said segments, means for continuously introducing alkali cellulose crumbs into one end of said container at a controlled rate, said reels, because of the differing speeds, moving said crumbs longitudinally through said container and agitating them so that each particle of alkali cellulose is uniformly contacted and reacted with the ethylene oxide, adjustable means controlling the rate of discharge of the reacted product from said container, means controlled by the temperature within said container for cooling said container, and automatically operable means for regulating the atmospheric pressure within said container.

4. A vessel for the continuous chemical reaction of alkali cellulose with ethylene oxide to produce hydroxyethyl cellulose comprising a horizontally arranged elongated container, two agitating reels mounted on parallel axes extending longitudinally through said container, means rotating said reels in opposite directions at speeds differing from one another, said reels having blades which describe substantially tangential paths, said container having bottom and outer side walls closely conforming with the paths of said blades and an upper compartment in open communication with both of said reels, partitions in said upper compartment, said partitions extending across said upper compartment transversely of the axes of said reels and having lower curved edges substantially conforming with the paths of said blades to divide said upper compartment into a plurality of segments longitudinally of said vessel, means for selectively introducing an ethylene oxide spray into said segments, a chute located in said upper compartment at one end of said container whereby alkali cellulose crumbs may be continuously introduced at a controlled rate, said reels moving said crumbs longitudinally through said container and agitating them so that each particle of alkali cellulose is uniformly contacted and reacted with the ethylene oxide, a discharge chute located at the opposite end of said container from said first mentioned chute, said discharge chute communicating with the interior of said container at a point above the axes of said reels, and means in said discharge chute for controlling the rate at which the reacted product is discharged from said container.

5. A vessel for the continuous chemical reaction of alkali cellulose with ethylene oxide to produce hydroxyethyl cellulose comprising a horizontally arranged elongated container, two agitating reels mounted on parallel axes extending longitudinally through said container, means rotating said reels in opposite directions at speeds differing from one another, said reels having blades which describe substantially tangential paths, said container having bottom and outer side walls closely conforming with the paths of said blades and an upper compartment in open communication with both of said reels, partitions in said upper compartment, said partitions extending across said upper compartment transversely of the axes of said reels and having lower curved edges substantially conforming with the paths of said blades to divide said upper compartment into a plurality of segments longitudinally of said vessel, means for selectively introducing an ethylene oxide spray into said segments, a chute located in said upper compartment at one end of said container whereby alkali cellulose crumbs may be continuously introduced at a controlled rate, said reels moving said crumbs longitudinally through said container and agitating them so that each particle of alkali cellulose is uniformly contacted and reacted with the ethylene oxide, a discharge chute located at the opposite end of said container from said first mentioned chute, said discharge chute communicating with the interior of said container at a point above the axes of said reels, means in said discharge chute for controlling the rate at which the reacted product is discharged from said container, and automatically operable means for regulating the atmospheric pressure within said container.

References Cited in the file of this patent

UNITED STATES PATENTS

| | | |
|---|---|---|
| 2,239,753 | Martin | Apr. 29, 1941 |
| 2,490,643 | Malm | Dec. 6, 1949 |
| 2,530,403 | Seman | Nov. 21, 1950 |
| 2,648,661 | Vandenburgh et al. | Aug. 11, 1953 |